United States Patent

[11] 3,624,641

[72] Inventors Lawrence E. Brennan
Los Angeles;
Irving S. Reed, Santa Monica, both of Calif.
[21] Appl. No. 830,792
[22] Filed June 5, 1969
[45] Patented Nov. 30, 1971
[73] Assignee Technology Service Corporation
Santa Monica, Calif.

[54] PHASE CONVERTER WITH A REFLECTED BINARY CODE OUTPUT
9 Claims, 4 Drawing Figs.

[52] U.S. Cl. 340/347 AD, 328/133
[51] Int. Cl. H03k 13/02
[50] Field of Search 340/347 AD, 170; 179/15, 55; 307/23 Z; 328/133; 329/110; 332/16; 324/83 D, 85

[56] References Cited
UNITED STATES PATENTS
3,068,456 12/1962 Nevius 340/347 X
3,460,122 8/1969 Barber et al. 340/347 X

*Primary Examiner*—Maynard R. Wilbur
*Assistant Examiner*—Michael K. Wolensky
*Attorney*—Lindenberg, Freilich & Wasserman

ABSTRACT: A phase converter is disclosed in which a selected number of higher order even harmonics of each of two signals, whose phase difference is to be converted to digital form, are generated. Corresponding even harmonics are mixed in separated mixers and filtered to provide an output in binary digital form. The fundamental harmonics of the two signal are combined to provide two outputs in binary digital form which together with the outputs of the other harmonics represent an output in the form of a reflected binary code.

LAWRENCE E. BRENNAN
IRVING S. REED
INVENTORS

BY Lindenberg & Freilich

ATTORNEYS

INVENTORS
LAWRENCE E. BRENNAN
IRVING S. REED
BY Lindenberg & Freilich
ATTORNEYS

PHASE CONVERTER WITH A REFLECTED BINARY CODE OUTPUT

BACKGROUND OF THE INVENTION

1. Field of the Invention

The present invention generally relates to phase detectors and, more particularly, to a system for providing an indication of the phase relationship between two high frequency signals in the form of a reflected binary code.

2. Description of the Prior Art

At present, there are many applications in which an analog signal is represented in terms of the phase difference between two sinusoidal signals. Phase converters or encoders are presently known which are capable of converting the phase difference between two sinusoidal signals into a related output, in the form of a multidigit number. However, most of these devices are not designed to operate at relatively high frequencies in the range of one or more megahertz (MHz.), neither do they provide a direct digital output in binary form. An output in binary form is particularly desirable since the majority of present-day digital computers operate on digital numbers in the form of multibinary digits or bits. Furthermore, none of the present-day phase converters provides a direct output in the form of a reflected binary code, also known as a Gray code.

As is appreciated by those familiar with binary codes, a Gray code is one in which successive binary representations or numbers differ by the value of only 1 bit. Such a code is particularly desirable to solve the problem of ambiguity at sector boundaries. When viewed in the context of a phase converter, a direct output in the form of a Gray code ensures that if the phase difference is near the boundary between two sectors and one bit is incorrectly represented, due to circuit malfunctioning, the resulting binary output value of the phase difference is in error only by one least-significant bit.

The Gray code output of such a phase converter may be supplied directly to a digital computer without intermediary binary code converting devices. Also, such a phase converter may be utilized in an analog-to-digital (A/D) converter to convert an analog signal supplied thereto directly into a Gray code.

OBJECTS AND SUMMARY OF THE INVENTION

It is a primary object of the present invention to provide a new improved system for converting phase differences between sinusoidal signals into binary Gray code representations.

A further object of the invention is to provide a new analog to digital converter in which an analog signal is converted into a Gray code binary representation.

Another object of the invention is to provide a system in which various state of the art circuits are interconnected in a novel manner to convert the phase difference between two sinusoidal signals directly into a binary Gray code representation.

A further object of the present invention is to provide a reliable phase converter for converting the phase differences between two relatively high frequency signals directly into binary representations in a Gray code.

These and other objects of the invention are achieved by providing a phase converter which includes devices which produce a selected number of higher-order even harmonics of each of the two signals whose phase difference is converted into a Gray code binary representation. For explanatory purposes, the two signals will be referred to as the reference signal and the phase-shifted signal. Corresponding even harmonics of the two signals are mixed together in separate mixers and filtered so that for each pair of corresponding even harmonics a direct current (DC) signal or voltage is provided. The amplitude and polarity of the DC voltage are a function of the cosine of the phase-difference angle and the harmonics' number.

The novel converter, hereafter also referred to as the encoder, also includes a phase shifter and two mixers, which after appropriate filtering provide one DC voltage which is a function of the sine of the phase difference angle and another DC voltage which is a function of the cosine of the phase difference angle. Each DC voltage is applied to a saturation amplifier whose output represents one bit of the converter's multibit Gray code binary representation. The amplifier's output is either of a first level, representing a first binary value, such as a binary one (1) or of a second binary value, such as a binary zero (0), depending on the DC voltage characteristics.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
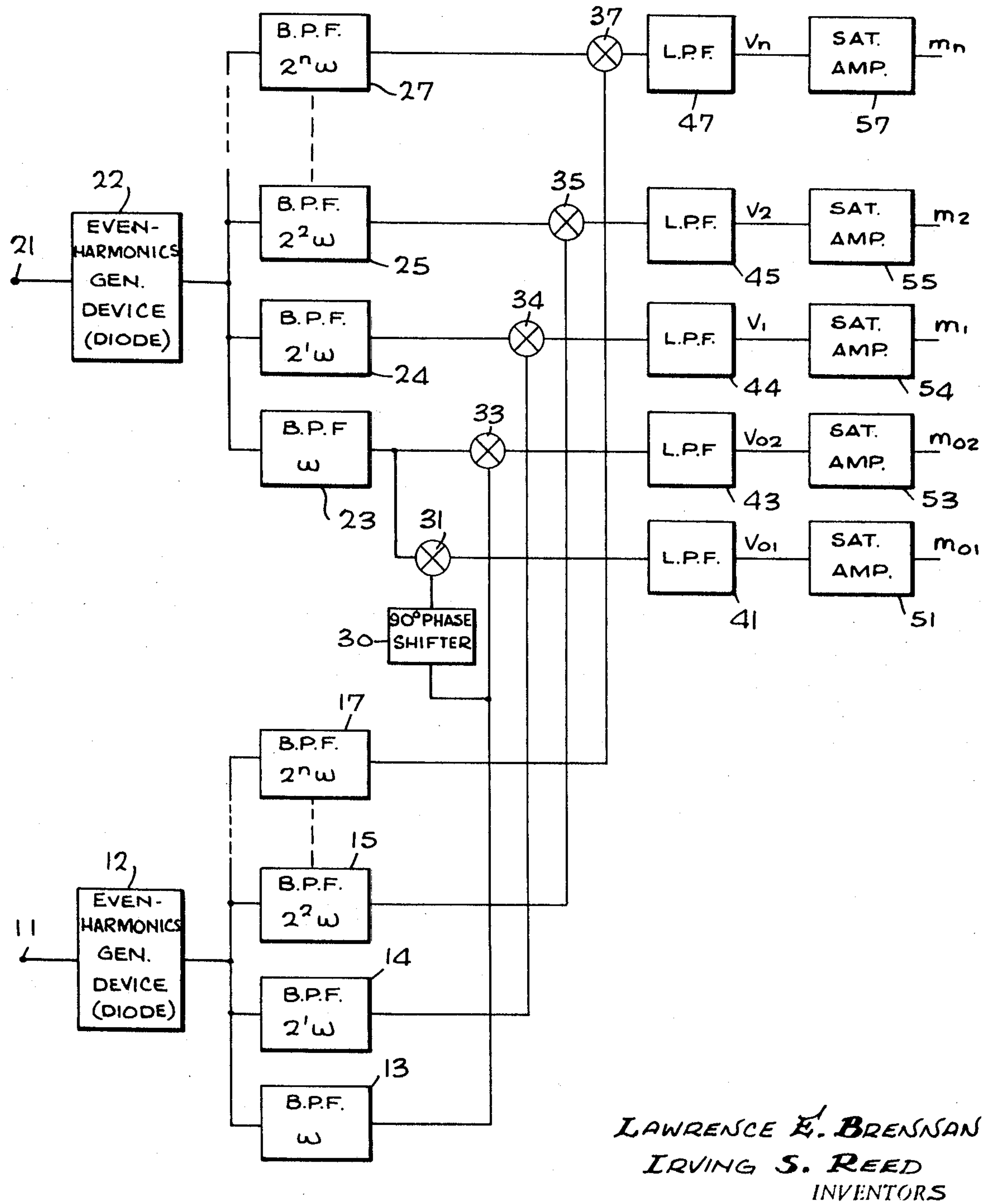
FIG. 1 is a block diagram of one embodiment of the present invention.

Attention is now directed to FIG. 1 which is a block diagram of a basic embodiment of the novel phase converter of the present invention. Therein, reference numeral 11 designates an input terminal to which a reference signal is assumed to be supplied. Terminal 11 is connected to an even-harmonics-generating device 12, which generates the fundamental harmonic, as well as a spectrum of even harmonics of the reference signal.

As is appreciated by those familiar with the art, a diode is particularly suited to produce a spectrum of even harmonics of an input signal. This, device 12 will hereafter be referred to as diode 12. Each harmonic is isolated by a band pass filter (BPF). Designating the fundamental harmonic $\omega$, the fundamental harmonic is separated by a BPF 13, while numerals 14, 15 and 17 designate BPF's which isolate the second harmonic $2^1\omega$, the fourth harmonic, designated $2^2\omega$ and the highest even harmonic designated $2^n\omega$, respectively.

The phase converter includes an identical input arrangement for the phase-shifted signal, which is assumed to be supplied to an input terminal 21. The identical arrangement includes an even-harmonics-generating device or diode 22, and a bank of BPF's 23, 24, 25 and 27. The latter are used to isolate the harmonics of the phase-shifted signal.

Corresponding isolated harmonics are mixed in separate mixers designated in FIG. 1 by numerals 33, 34, 35 and 37. In addition, the output of BPF 13, representing the fundamental harmonic of the reference signal is phase-shifted by 90° by a phase-shifter 30 whose output is mixed by a mixer 31 with the fundamental harmonic of the phase-shifted signal, present at the output of BPF 23. The output of each mixer is supplied to a low pass filter (LPF) whose output represents only the DC component of its associated mixer. This DC component is a DC voltage. The filters associated with mixers 31, 33, 34, 35 and 37 are designated by numerals 41, 43, 44, 45 and 47, respectively.

The outputs of these filters are designated $V_{01}$, $V_{02}$, $V_1$, $V_2$ and $V_n$. The operation of the part of the phase converter, described so far, may best be explained by the following remarks. Defining the reference signal as $\cos(\omega t)$ and the phase-shifted signal as $\cos(\omega t+\psi)$, where $\psi$ is the phase difference, the output of each of mixers 33, 34, 35 and 37 may be expressed as, $$\cos(2^x t+2^x\psi)\cos(2^x\omega t)=\tfrac{1}{2}\cos(2\cdot 2^x\omega t+2^x\psi)+\tfrac{1}{2}\cos(2^x\psi),$$

where $x$ is 1, 2 and $n$ for mixers 34, 35 and 37, respectively.

The first term on the right side of the expression is the high frequency component which is filtered out by the LPF coupled to the mixer's output. Thus, the outputs of filters, 44, 45 and 47 may be expressed as, $V_1=½\cos(2^1\psi)$ $V_2=½\cos(2^2\psi)$ and $V_n=½\cos(2^n\psi)$.

Generalizing, the output of each of these LPF's may be expressed as, $$V_x=½\cos(2^x\psi) \text{ when } x\geq 1.$$

Since mixer 33 mixes the fundamental harmonics without any phase shifting by shifter 30, the output of mixer 33 may be expressed as, $$V_{33}=½\cos(2\omega t+\psi)+½\cos(\psi).$$

The term $½\cos(2\omega t+\psi)$ is filtered out by LPF 43. Thus, the output of the latter is $$V_{02}=½\cos(\psi).$$

The output of $V_0$ of LPF 41 may be determined by first considering the output of mixer 31. The output of the latter is the product of the fundamental harmonics of the two signals which are phase-shifted with respect to one another by 90°. Thus, the output of mixer 31 is expressable as, $$V_1=½\sin(2\omega t+\psi)+½\sin(\psi).$$

The high frequency component is filtered out by filter 41. Thus, $$V_{01}=½\sin(\psi).$$

The set voltages, $V_{01}$, $V_{02}$, $V_1$, $V_2$ and $V_n$ is converted to a multibinary digit (0,1) representation by supplying the voltages to a set of saturating amplifiers, designated by reference numerals 51, 53, 54, 55 and 57, whose outputs are designated $m_{01}$, $m_{02}$, $m_1$, $m_2$ and $m_n$.

Basically the output of each amplifier is of a first level representing a binary 1 if the voltage V supplied thereto is greater than zero volts. On the other hand, the output of the amplifier is of a second level, representing a binary 0, if its input voltage is zero or a negative voltage.

Figures 2, 3:
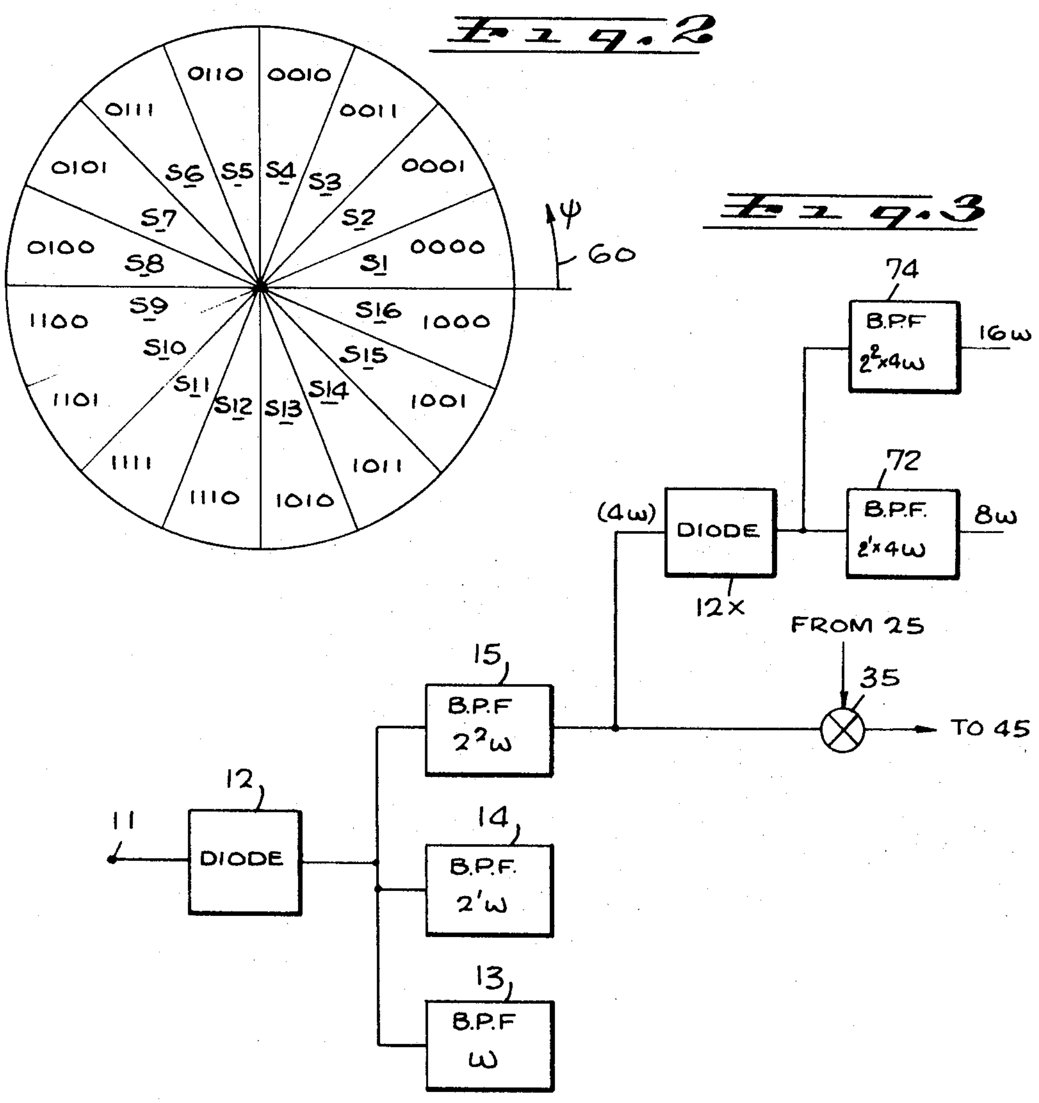
FIG. 2 is a simple diagram, useful in explaining the Gray code characteristics of the output of the present invention.
FIG. 3 is a partial block diagram of another embodiment of the invention.

The output binary representation of $\psi/2\pi$ is, $m_{01}=½(1-sgn[\sin\psi])$ $m_{02}=½(1-sgn[\cos\psi])$ $m_1=½(1-sgn[\cos 2\psi])$ $\vdots$ $m_n=½(1-sgn[\cos(2^n\psi)]$ where $sgn(x)=1 \quad x>0$ $=-1 \quad x\leq 0.$ A careful inspection of the output binary representation reveals that the output is in the form of a reflected binary code or Gray code. This novel characteristic of the phase converter becomes apparent when considering a specific example, such as, for example, a phase converter with a four-bit output representation. In such a converter, the representation consists of $m_{01}$, $m_{02}$, $m_1$ and $m_2$. FIG. 2 to which reference is made is used to display $2_4$ sectors designated S1–S16 with their corresponding four-bit representations, which depend on the phase difference in degrees. The phase difference, $\psi$ in degrees is assumed to increase from 0° in the direction of arrow 60.

Therefrom it should be appreciated that as long as the angle $\psi$ is in the range of 0° up to 22.5° the angle is in sector S1, with each of the four saturating amplifiers providing a binary 0 output, for a 0000 representation. For a phase difference of 22.5° up to 45°, the angle is in sector S2, represented by a binary representation of 0001, with only *m2* providing a binary 1.

From FIG. 2 it should thus be apparent that in the converter of the present invention the output is produced directly in a binary Gray code, since only a single-bit change occurs between adjacent binary representations. As between the two adjacent representations the changing bit is the least-significant one. Thus, the advantages which are realizable by means of such a code, which have been discussed herebefore, are inherent in the novel converter of the present invention.

From the foregoing it should thus be apparent that in the present invention a set of even harmonics is generated for each of the two input signals, i.e., the reference signal and the phase-shifted signal. In the converter except corresponding even harmonics (such as $2n\omega$) in the two sets are mixed together in a mixer (such as 37). The output of the mixer is filtered by a LPF (such as 47) whose output is a DC voltage. The amplitude and polarity of this voltage (such as $V_n$) is a function of the cosine of the phase-difference angle ($\psi$) times the logarithm to the base 2 of the number of the corresponding harmonics. The fundamental harmonics of the signals which may be thought of as part of the two sets are combined to provide one DC voltage which is a function of the cosine of the phase-difference angle and another DC voltage which is a function of the sine of the phase-difference angle.

Each DC voltage is supplied to a saturating amplifier operable to provide an output of a first binary value, e.g., a 0, if the voltage is positive and greater than zero, while providing an output of a second binary value, e.g., a 1, when the voltage is zero or has a negative polarity. The number of bits of the output binary representation is N+2.

$$N=\log_2 M,$$

where M is equal to the highest even harmonic which is generated.

It should be pointed out that in the present invention the various bits, which together form the output binary representation, are produced in parallel. This represents a marked advantage since it minimizes the phase-difference conversion time. It is particularly significant when the converter's output is supplied to a computer, since the parallel bit generation enables the converter to provide the computer with the required binary representation in minimum time.

The novel converter of the present invention is operable at relatively high frequencies since all of the circuits or devices, incorporated therein, which have to respond and operate on the sinusoidal signals are of types which are available for high frequency operation. This is particularly significant since it enables the converter to be incorporated in any high frequency communication system in which signals may be communicated in the form of phase difference which would be converted directly by the converter into multibit representations in the Gray code.

It should be appreciated that for an increase in the representation length by one bit, the highest even harmonic which has to be generated increases by a factor of 2. For example, for a five-bit representation, the highest required harmonic in each set is the eighth harmonic, while the 16the harmonic is required for a six-bit representation. Herebefore, it has been assumed that a single diode, such as diode 12, generates all the required harmonics of the reference signal, and likewise, all the harmonics of the phase-shifted signal are generated by diode 22. Such an assumption is valid if the amplitudes of the highest order even harmonics which the two diodes generate are high enough above a noise level, so that they can be mixed by their associated mixer (such as 37) to provide the desired output. In the absence of sufficient signal amplitudes of the highest harmonics, it is necessary to either amplify these harmonics prior to mixing or generate them by means of an arrangement, different from the one shown in FIG. 1.

A partial block diagram of one such arrangement, in which the highest order harmonics is assumed to be the 16th harmonic, is shown in FIG. 3. Therein diode 12 is assumed to generate the fundamental harmonic of the reference signal as well as the second and fourth harmonics. The fourth harmonic ($4\omega$) is isolated by BPF 15 as hereinbefore described. However, unlike the arrangement shown in FIG. 1, in which the output ($4\omega$) of BPF 15 is only supplied to mixer 35, in the FIG. 3 arrangement, the $4\omega$ output of BPF 15 is also supplied to a diode 12*x*. The latter operates in the same manner as diode 12. That is, it generates even harmonics of its input signal $4\omega$. In the particular example, the second harmonic produced by diode 12*x* is the eighth harmonic $8\omega$ of the reference signal. This harmonic is isolated in a BPF 72. The fourth harmonics produced by diode 12*x* of its input signal $4\omega$ is actually the 16th harmonics of the reference signal. This harmonic is in turn isolated by a BPF 74. Thus, the necessary set of harmonics of the reference signal is produced.

However, whereas in FIG. 1 a single diode is assumed to generate the set, in the FIG. 3 embodiment two diodes 12 and 12*x* produce the necessary set. A similar two diode arrangement may be incorporated to generate the set of harmonics of the phase-shifted signal. It should be appreciated that any other arrangement or technique may be employed to generate the two sets of harmonics of the two signals and that therefore the foregoing description of the single diode and the two-diode arrangements should be considered as examples rather than as a limitation on the scope of the invention.

The novel phase converter may be employed in an application in which it is desired to represent the phase difference between two sinusoidal signals by a multibit representation. It may further be employed in an analog-to-digital (A/D) converter to convert any analog input signal into a multibit Gray code representation.

Figure 4:
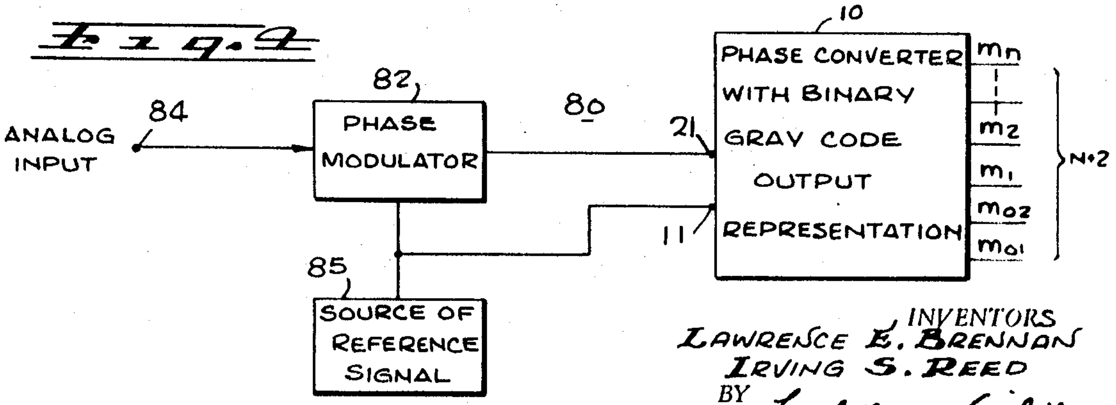
FIG. 4 is a block diagram of a novel analog-to-digital converter, in which the encoder of the present invention is incorporated.

One embodiment of such an A/D converter is shown in FIG. 4. Basically the A/D converter generally designated by numeral 80 includes a phase modulator 82 which is supplied with an analog input assumed to be applied at an input terminal 84. The modulator 82 is supplied with a sinusoidal reference signal from a source 85. This reference signal is also supplied to terminal 11 of the novel phase converter 10.

The modulator 82 modulates the phase of the reference signal supplied thereto as a function of the analog input and applies the phase-modulated reference signal to terminal 21 of the converter 10. Thus, the phase difference between the two signals at terminals 11 and 21 represents the analog input. This phase difference is then converted by converter 10 to a binary representation as herebefore explained. Thus, the circuit shown in FIG. 4 is an A/D converter which directly converts an analog input into a multibit representation in Gray code.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A circuit for converting the phase difference between a reference signal and a second signal, phase-shifted with respect to said reference signal, into a multibit representation, comprising:

first means responding to a first reference signal supplied thereto for producing a first set of harmonics, including a plurality of even-numbered harmonics of said reference signal, each even-numbered harmonic in said first set being twice a lower harmonic in the set;

second means responding to a second signal, phase-shifted with respect to said first reference signal, supplied thereto for providing a second set of harmonics, including a plurality of even-numbered harmonics of said phase-shifted signal, each even harmonic in said second set being twice a lower harmonic in the set;

third means coupled to said first and second means for combining pairs of corresponding harmonics in the first and second sets to provide for each pair of corresponding even-numbered harmonics an output signal whose characteristics are a function of the phase difference between the first and second signals and the number of the harmonics pair;

fourth means for combining the fundamental harmonics of said first and second signals to provide a pair of output signals which are functions of the phase difference therebetween; and output means to which the output signals of said third and fourth means are directly supplied for directly providing a one-bit representation for each output signal as a function of its characteristics.

2. The arrangement as recited in claim 1 wherein said output means provide a representation of N+2 bits wherein $N=\log_2 M$, being the largest even-numbered harmonic produced by each of first and second means.

3. The arrangement as recited in claim 2 wherein said N+2 bit representation is in a reflected binary code.

4. The arrangement as recited in claim 1 wherein said fourth means combine the fundamental harmonics of said first and second signals to provide first and second output signals which are functions of the cosine and sine of the phase difference between said first and second signals and each output signal provided by said third means is expressable as $V\rho$, where $$V\rho=\tfrac{1}{2}\cos(2^x\psi),$$

$\psi$ is the phase difference and $x=\log_2\rho$, $\rho$ being the even number of the corresponding harmonics pair which are combined by the third means to produce the output signal $V\rho$.

5. The arrangement as recited in claim 4 wherein said output means provide a representation of N+2 bits, wherein $N=\log_2 M$, and M is the largest even harmonics produced by said first and second means.

6. The arrangement as recited in claim 5 wherein said N+2 bit representation is in a reflected binary code.

7. An analog-to-digital converter comprising:

input means for receiving an analog input signal;

a source of a reference sinusoidal signal; and circuit means to which said input signal and said reference signal are applied for generating even-numbered harmonics for each signal, combining corresponding harmonics of the two signals and directly generating one bit representations for each corresponding combined harmonics, said one-bit representation defining a reflected binary code, said circuit means comprises first means responding to said reference signal for producing a first set including at least a plurality of numbered even harmonics of said reference signal, each even harmonics in said first set being twice a lower harmonics in the set, second means responding to said input signal, which is phase-shifted with respect to said first signal for providing a second set harmonics, including at least a plurality of even harmonics of said phase-shifted input signal, each even harmonics in said second set being twice a lower harmonics in the set, third means coupled to said first and second means for combining pairs of corresponding harmonics in the first and second sets to provide for each pair of corresponding even harmonics an output signal whose characteristics are a function of the phase difference between the reference and input signals and the even number of the harmonics pair, fourth means responsive to said first and second means for providing a pair of output signals whose characteristics are functions of the phase difference between the reference and input signals, and output means to which said output signals are supplied for providing a one-bit representation for each output signal as a function of the output signal characteristics.

8. The arrangement as recited in claim 7 wherein said third means further combine the fundamental harmonics of said first and second signals to provide first and second output signals which are functions of the cosine and sine of the phase difference respectively and each other output signal is expressable as $V\rho$, where $V\rho=\tfrac{1}{2}\cos(2^X\psi)$, $\psi$ is the phase difference and $X=\log_2\rho$, $\rho$ being the even number of the corresponding harmonics pair which are combined by the third means to produce the output signal $V\rho$.

9. The arrangement as recited in claim 8 wherein said output means provide a representation of N+2 bits wherein $N=\log_2 M$, wherein M is the largest even harmonics produced by said first and second means.

* * * * *